UNITED STATES PATENT OFFICE.

ALVAH W. HOLWAY, OF BOSTON, MASSACHUSETTS.

BAKING-POWDER.

SPECIFICATION forming part of Letters Patent No. 358,612, dated March 1, 1887.

Application filed November 18, 1885. Serial No. 183,230. (Specimens.)

*To all whom it may concern:*

Be it known that I, ALVAH W. HOLWAY, a citizen of the United States, and a resident of Boston, in the county of Suffolk and State of Massachusetts, have invented certain new and useful Improvements in Baking-Powders, of which the following is a specification.

My invention relates to an improvement in baking-powders; and it consists of a powder composed of mucic acid and any of the bicarbonates of alkalies, and, if desired, a small quantity of anhydrous starch. Heretofore cream of tarter has been extensively used for this purpose; but such is open to many objections. I have found that my improved powder, consisting of the ingredients above named, overcomes all objections heretofore urged against other powders of the same character, and is far superior to cream of tarter in its results.

Mucic acid is dibasic and has a molecular weight of two hundred and ten, and that of cream of tartar, which is monobasic; one hundred and eighty-eight. One hundred and eighty-eight pounds of cream of tarter would (if it were absolutely pure) be required to neutralize as much bicarbonate of soda as one hundred and five pounds of mucic acid. Their relative strengths are then as one hundred and five is and one hundred and eighty-eight.

In the form of mucates mucic acid is innoxious and salutary, as I have proved, and is of greater whiteness than other baking-powders. It is also quite insoluble, so that the reaction developed by soda is much more moderate and slower than with soluble salts.

Any of the bicarbonates of the alkalies may be used, such as the acid carbonate of sodium, bicarbonate of potash, &c. If the former ingredient is employed, I prefer to use two hundred and ten parts (by weight) of mucic acid to one hundred and sixty-eight parts of the soda salt, and if the latter I use two hundred and ten parts of the mucic acid to two hundred parts of the bicarbonate of potash.

A larger quantity of the acid might be employed, and hence I do not limit myself to any particular proportion of the ingredients, nor to any particular bicarbonate; but

What I claim is—

1. A baking-powder consisting of mucic acid and bicarbonate of alkali.

2. A baking-powder consisting of mucic acid, bicarbonate of alkali, and anhydrous starch, substantially in the proportions named.

Signed at Boston, in the county of Suffolk and State of Massachusetts, this 5th day of November, A. D. 1885.

ALVAH W. HOLWAY.

Witnesses:
L. H. FULLER,
LAWRENCE BOND.